(12) United States Patent
Abarra et al.

(10) Patent No.: US 7,566,507 B2
(45) Date of Patent: Jul. 28, 2009

(54) MAGNETIC RECORDING MEDIUM, MAGNETIC STORAGE APPARATUS AND METHOD OF PRODUCING MAGNETIC RECORDING MEDIUM

(75) Inventors: E. Noel Abarra, Santa Clara, CA (US); Akihiro Inomata, Kawasaki (JP); Antony Ajan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 11/221,270

(22) Filed: Sep. 7, 2005

(65) Prior Publication Data

US 2006/0003190 A1    Jan. 5, 2006

Related U.S. Application Data

(63) Continuation of application No. PCT/JP03/05623, filed on May 2, 2003.

(51) Int. Cl.
*G11B 5/66* (2006.01)

(52) U.S. Cl. .................................... 428/831.2; 428/828

(58) Field of Classification Search ........................ None
See application file for complete search history.

(56) References Cited

U.S. PATENT DOCUMENTS

| | | | |
|---|---|---|---|
| 4,776,938 A | 10/1988 | Abe et al. | |
| 5,605,733 A | 2/1997 | Ishikawa et al. | |
| 5,804,046 A | 9/1998 | Sawada et al. | |
| 5,875,082 A | 2/1999 | Takayama et al. | |
| 6,183,893 B1 | 2/2001 | Futamoto et al. | |
| 6,524,730 B1 * | 2/2003 | Chen | 428/811.3 |
| 6,562,489 B2 | 5/2003 | Abarra et al. | |
| 6,645,614 B1 * | 11/2003 | Girt et al. | 428/336 |
| 6,828,047 B2 | 12/2004 | Abarra et al. | |
| 7,094,483 B2 * | 8/2006 | Pelhos et al. | 428/832 |
| 2001/0033949 A1 | 10/2001 | Abarra et al. | |

FOREIGN PATENT DOCUMENTS

| EP | 0 227 069 | 7/1987 |
|---|---|---|
| JP | A 5-197942 | 8/1993 |
| JP | A 7-141639 | 6/1995 |
| JP | A 11-296833 | 10/1999 |
| JP | A 2002-304722 | 10/2002 |

OTHER PUBLICATIONS

Y.Y.Zou; "Tilted media in a perpendicular recording system for high areal density recording"; Applied Physics Letters, vol. 82, No. 15; pp. 2473-2475; Apr. 14, 2003.

(Continued)

*Primary Examiner*—Holly Rickman
(74) *Attorney, Agent, or Firm*—Greer, Burns & Crain, Ltd.

(57) ABSTRACT

A magnetic recording medium is provided with an hcp Co alloy magnetic layer with the crystallographic c-axes tilted at an angle from a substrate surface and fixed relative to a recording direction. The tilt is induced by epitaxial growth of the hcp Co alloy on an obliquely evaporated nonmagnetic polycrystalline underlayer, so that the magnetic recording medium exhibits thermal stability and improved overwrite with a single pole-type head.

11 Claims, 9 Drawing Sheets

OTHER PUBLICATIONS

Mallary et al.; "One Terabit per Square Inch Perpendicular Recording Conceptual Design"; IEEE Trans. on Mag., vol. 38, No. 4; pp. 1719-1724; Jul. 2002.

Gao et al.; "Magnetic Recording Configuration for Densities Beyond 1 Tb/in$^2$ and Data Rates Beyond 1 Gb/s"; IEEE Trans. on Mag., vol. 38, No. 6; pp. 3675-3683; Nov. 2002.

Zheng et al.; "Control of the tilted orientation of CoCrPt/Ti tin film media by collimated sputtering"; Journal of App. Physics, vol. 91, No. 10; pp. 8007-8009; May 15, 2002.

Hee et al.; "Tilted media by micromagnetic simulation: A possibility for the extension of longitudinal magnetic recording?"; Journal of App. Physics, vol. 91, No. 10; pp. 8004-8006; May 15, 2002.

Velu et al.; "Low Noise CoCrPtO Perpendicular Media with Improved Resolution"; presentation at TMRC; Aug. 2002.

A. Otsuki; Development of Large-Capacity Perpendicular Magnetic Recording Media; presentation at IDEMA, 2002.

McMichael et al.; "Strong anisotropy in thin magnetic films deposited on obliquely sputtered Ta underlayers"; Journal of App. Physics, vol. 88, No. 9; pp. 5296-5299; Nov. 1, 2000.

Michijima et al.; "Oblique-incidence Anisotropy in Very Thin Ni-Fe Films"; IEEE Trans. on Mag., vol. 35, No. 5; pp. 3442-3444; Sep. 1999.

Fujimoto et al.; "An ultrahigh vacuum sputtering system with offset incidence magnetron sources onto a rotating substrate"; Review of Scientific Instruments, vol. 70, No. 11; pp. 4362-4365; Nov. 1999.

\* cited by examiner

MAGNETIC RECORDING MEDIUM, MAGNETIC STORAGE APPARATUS AND METHOD OF PRODUCING MAGNETIC RECORDING MEDIUM

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2003/005623 filed May 2, 2003, in the Japanese Patent Office, the disclosure of which is hereby incorporated by reference.

The PCT International Application No. PCT/JP2003/005623 was published in the English language under International Publication Number WO 2004/097809 A1 on Nov. 11, 2004.

BACKGROUND OF THE INVENTION

1. Field of the Invention

The present invention generally relates to magnetic recording media, magnetic storage apparatuses and methods of producing magnetic recording media, and more particularly to a magnetic recording medium having a magnetic recording layer with tilted anisotropy easy axes, a magnetic storage apparatus which uses such a magnetic recording medium, and a method of producing a magnetic recording medium by inducing the magnetic easy axes of the magnetic recording layer to a particular direction with a high degree of alignment while maintaining vertical columnar growth for the magnetic layer.

The magnetic recording medium having the magnetic recording layer with the tilted anisotropy easy axes is sometimes referred to as a tilted perpendicular magnetic recording medium.

2. Description of the Related Art

There are three possible modes for recording which depend on the orientation of the anisotropy easy axes of a magnetic recording layer relative to the recording direction. The most popular for rigid disk applications is the longitudinal mode in which the easy axes of the magnetic recording layer are parallel to the substrate surface (in-plane) in a random way or oriented where most of the axes point along the circumferential direction. Due to the high demagnetizing fields Hd at high densities, the perpendicular mode has also been proposed. For this perpendicular mode, the easy axes of the magnetic recording layer are normal to the disk surface (film normal), and the demagnetizing field Hd is an issue only at low densities or long bit lengths.

Early perpendicular magnetic recording media showed significant thermal decay at low densities due to poor alignment of the easy axes to the film normal. Improvements in the underlayer and the use of multilayers which derive their anisotropy from the interfaces resulted in perpendicular magnetic recording media with easy axes having a high degree of alignment. This is evidenced by narrow XRD rocking curves and squareness S=1 which greatly improved thermal stability as well as reduced DC noise, that is, the noise at very low densities.

Perpendicular recording is thought to replace longitudinal recording. By employing a perpendicular magnetic recording medium with a soft magnetic underlayer (SUL), higher write fields may be theoretically achieved from a single pole-type (SPT) head, which enables higher anisotropy media with good thermal stability. However, as the direction of the head field during writing is almost parallel to the easy axis, the switching field Ho is a large fraction of the anisotropy field Hk.

Mallary et al., "One Terabit per Square Inch Perpendicular Recording Conceptual Design", IEEE Trans. Magn. Vol. 38, No. 4, pp. 1719-1724, July 2002 have proposed shields for the SPT head which gives a transverse component along the recording direction to the field aside from the vertical component. This reduces the overall field strength and complicates the already difficult head fabrication.

An interesting concept has been reported by Gao et al., "Magnetic Recording Configuration for Densities Beyond 1 Tb/in$^2$ and Data Rates Beyond 1 Gb/s", IEEE Trans. Magn. Vol. 38, No. 6, pp. 3675-3683, November 2002, wherein the anisotropy axes of the magnetic recording layer are uniformly tilted in the cross track (radial) direction at 45°. With the easy axis at 45° to the recording field, the switching field is close to one-half the grain anisotropy field. At 1 Tbit/in$^2$, they estimated a 12 dB increase in signal-to-noise ratio (SNR) compared to conventional perpendicular recording. This arises mostly from the increase in the grain anisotropy due to the angled recording configuration. This case may be classified under the third mode which is the tilted or oblique mode.

Magnetic recording media with the easy axes tilted at a fixed angle relative to the head field has been used for many years for magnetic tape applications. Moreover, the magnetic recording medium proposed by Gao et al. has been proposed several years earlier by a U.S. Pat. No. 5,875,082 to Takayama et al. In Takayama et al., Ti was used as an underlayer and sputter-deposited at an oblique angle. CoCrTa was deposited at normal incidence but the resulting c-axes for both layers were tilted from the film normal and aligned along the radial direction.

Zheng et al., "Control of the tilted orientation of CoCrPt/Ti thin film media by collimated sputtering", J. Appl. Phys., Vol. 91, No. 10, pp. 8007-8009, May 2002 proposed a tilted CoCrPt/Ti magnetic recording medium wherein the magnetic layer is deposited using a collimator similar to that proposed by a U.S. Pat. No. 5,804,046 to Sawada et al. with the angle of the slots tilted by 45°. In contrast to Takayama et al., the Ti underlayer was deposited largely at vertical incidence. The cross-sectional TEM image shows that the magnetic layer columns themselves are tilted similar to tape media. The problem with this tilted columnar structure is that the "footprint" of a magnetic grain is enlarged along the tilt direction. The read head senses larger magnetic grains compared to when the columns are vertical. The result is a broader transition width for a tilt along the recording direction or a larger cross-track correlation length if the columns are inclined perpendicular to the recording direction. Both result in higher medium noise.

Hee et al., "Tilted media by micromagnetic simulation: A possibility for the extension of longitudinal magnetic recording?", J. Appl. Phys. Vol. 91, No. 10, May 2002 proposed a simulation study of using a ring-head with a tilted perpendicular magnetic recording medium wherein the tilt is along the recording direction. Hee et al. cite the work Zheng et al. as to how such a magnetic recording medium could be fabricated.

A typical perpendicular medium includes an underlayer and a magnetic layer. To realize large head fields, an SPT head may be used and an SUL added to the medium structure. The SUL becomes a "part" of the head structure with the magnetic recording medium in the "gap". Preferably, this gap is as narrow as possible such that thin underlayers are necessary.

The underlayer may be made of a single layer such as Ti or several layers such as CoCr on Ti. For hcp magnetic layers, the underlayer may be hcp or fcc or a combination. fcc materials tend to easily form the (111) texture on which an hcp material grows with a (0002) texture. An amorphous layer may also be deposited on the SUL to prevent any structural information from the normally thick SUL (200 nm) to be propagated to the magnetic layer.

The magnetic layer may be made of CoCrPt alloys which have magnetocrystalline anisotropies coming from the bulk of the film. The magnetic layer may also be made of multilayers of Fe/Pt, Co/Pt, Co/Pd, or CoB/Pd where the anisotropy arises from the interfaces. For these multilayers, large anisotropy values and orienting the anisotropy axis along the film normal may be easily achieved. A large nucleation field Hn (>2000 Oe) may also be realized which makes the magnetic recording medium robust against head field erasure. However, due to the large exchange interaction between the film grains, noise is difficult to control. This makes CoCrPt alloys attractive although the anisotropy values cannot match those of the multilayers. But for the available head fields, CoCrPt alloys are sufficient.

Orienting the c-axes of hcp Co alloys along the film normal seems easy as the c-plane has the least surface energy, but S=1 is difficult to achieve. The deviation of the c-axes from the normal must be small. A measure of this is usually specified by $\Delta\theta$ of the (0002) peak in an XRD spectrum data. On a thin layer of amorphous Ti, a U.S. Pat. No. 6,283,893 to Futamoto et al. were able to grow CoCr with a (0001) texture. With process improvements, tight control of the c-axis orientation may now be achieved resulting in S=1, but a large nucleation field Hn is more difficult to achieve.

Recent reports on CoCrPtO and CoCrPt—$SiO_2$ have shown that both S=1 and large nucleation field Hn may now be realized. For example, Velu et al., "Low Noise CoCrPtO Perpendicular Media With Improved Resolution", presentation at TMRC, August 2002, have shown that a CoCrPt—O/Ru/SUL medium exhibits a high squareness S, a large nucleation field Hn (>1000 Oe), and good recording resolution. With a CoCrPt—$SiO_2$ magnetic layer, A. Otsuki, "Development of Large-Capacity Perpendicular Magnetic Recording Media", presentation at IDEMA, 2002 was able to realize very high linear densities, and 900 kfci patterns were observed with magnetic force microscopy. In the case of Velu et al., the Ru layer has a thickness of 25 nm to 30 nm. This Ru layer, however, needs to be drastically reduced to around <10 nm, in order to improve resolution, increase head fields, and reduce side erasure due to the spreading of the head field to the neighboring tracks.

From Gao et al., conventional perpendicular magnetic recording media may be further improved by tilting the anisotropy axes along a particular direction, such as the radial direction, but Gao et al. provided no suggestions on how this may be achieved. Present tape media including the media suggested by Zheng et al. have inclined columns which increase noise. Moreover, for the latter, the collimator used does not allow substrates that are disk-shaped. Takayama et al. proposed a way to make such media by depositing the Ti underlayer using masks similar to what a U.S. Pat. No. 4,776,938 to Abe et al. have earlier reported. However, the direction of the tilt along the film plane (or projection on the plane) is not fixed relative to the recording head. The Ti underlayer thickness was also too thick especially for the magnetic recording medium with a soft magnet underlayer.

The U.S. Pat. No. 6,183,893 to Futamoto et al. disclosed an advanced perpendicular medium structure with a first layer which may be amorphous, an hcp second underlayer, and two magnetic layers that may be separated by a nonmagnetic spacer layer such as Ru or Re. Such a perpendicular medium structure may be made with a soft magnetic underlayer (SUL) to be use with an SPT head. Overwrite for such head/medium system may be improved by tilting the c-axes from the film normal.

A Ru spacer layer is also employed in longitudinal magnetic recording media to induce antiferromagnetic coupling between two or more magnetic layers. This structure is called a synthetic ferrimagnetic medium (SFM). However, for this case, a very narrow range of Ru thickness is essential (0.6 to 0.9 nm). The result is a thermally stable magnetic recording medium on which high linear densities may be written. However, this SFM concept cannot be readily applied to perpendicular magnetic recording media since the antiferromagnetic coupling is significantly reduced in the case of the perpendicular magnetic recording media.

SUMMARY OF THE INVENTION

Accordingly, it is a general object of the present invention to provide a novel and useful magnetic recording medium, magnetic storage apparatus and method of producing a magnetic recording medium, in which the problems described above are eliminated.

Another and more specific object of the present invention is to provide a magnetic recording medium, having a magnetic recording layer with anisotropy axes tilted from the film normal with the tilt at a fixed angle relative to the recording direction, so as to reduce the magnetic grain area footprint, improve the alignment of the anisotropy axes relative to the recording direction, reduce the thickness of the underlayer or underlayers, and enhance antiferromagnetic coupling between two magnetic layers in the case of the magnetic recording layer having a multi-layer structure, and to provide a magnetic storage apparatus which uses such a magnetic recording medium and a method of producing such a magnetic recording medium.

Still another object of the present invention is to provide a magnetic recording medium comprising a substrate, an hcp Co-based magnetic layer, and an hcp underlayer provided on the substrate with c-axes tilted at an angle between 10° to 45° from a substrate normal with a distribution at the angle being less than 5°, wherein the magnetic layer is grown epitaxially on the underlayer and in a vertical columnar fashion. According to the magnetic recording medium of the present invention, it is possible to obtain a magnetic recording layer with the anisotropy axes tilted from the substrate normal with the tilt at a fixed angle relative to the recording direction, so as to reduce the magnetic grain area footprint, improve the alignment of the anisotropy axes relative to the recording direction, reduce the thickness of the underlayer or underlayers, and enhance antiferromagnetic coupling between two magnetic layers in the case of the magnetic recording layer having a multi-layer structure.

A further object of the present invention is to provide a method of producing a magnetic recording medium having a substrate, an hcp underlayer provided on the substrate, and an hcp Co-based magnetic layer, comprising evaporating an underlayer material in an oblique fashion with majority of incident atoms arriving at the substrate at an angle greater than 25° from a substrate normal, so that c-axes of the underlayer are tilted at an angle between 10° to 45° from the substrate normal with a distribution at the angle being less than 5°, and epitaxially growing the magnetic layer on the underlayer and in a vertical columnar fashion. According to the method of producing the magnetic recording medium of the present invention, it is possible to produce a magnetic recording medium having a magnetic recording layer with anisotropy axes tilted from the film normal with the tilt at a fixed angle relative to the recording direction, so as to reduce the magnetic grain area footprint, improve the alignment of the anisotropy axes relative to the recording direction, reduce the thickness of the underlayer or underlayers, and enhance antiferromagnetic coupling between two magnetic layers in the case of the magnetic recording layer having a multi-layer structure.

Another object of the present invention is to provide a magnetic storage apparatus comprising at least one magnetic recording medium, and a transducer writing information on and/or reading information from the magnetic recording medium, where the magnetic recording medium comprises a substrate, an hcp Co-based magnetic layer, and an hcp underlayer provided on the substrate with c-axes tilted at an angle between 10° to 45° from a substrate normal with a distribution at the angle being less than 5°, wherein the magnetic layer is grown epitaxially on the underlayer and in a vertical columnar fashion. According to the magnetic storage apparatus of the present invention, it is possible to use the magnetic recording medium having a magnetic recording layer with anisotropy axes tilted from the film normal with the tilt at a fixed angle relative to the recording direction, so as to reduce the magnetic grain area footprint, improve the alignment of the anisotropy axes relative to the recording direction, reduce the thickness of the underlayer or underlayers, and enhance antiferromagnetic coupling between two magnetic layers in the case of the magnetic recording layer having a multi-layer structure.

Other objects and further features of the present invention will be apparent from the following detailed description when read in conjunction with the accompanying drawings.

DESCRIPTION OF THE PREFERRED EMBODIMENTS

Figure 1:
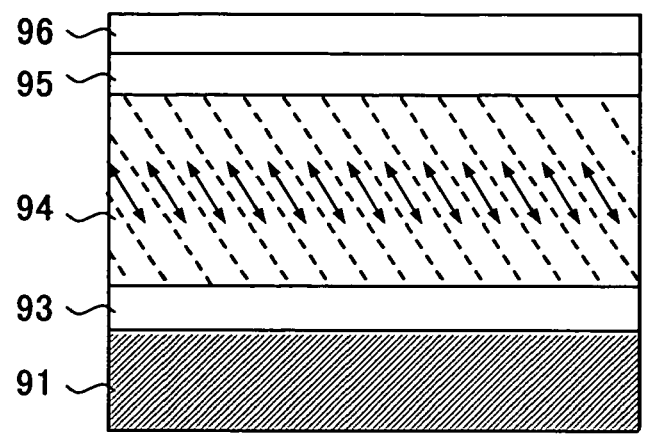
FIG. 1 is a cross sectional view showing a typical tilted perpendicular magnetic recording medium.

Tilted-axis magnetic recording media have been widely used for many years on a tape substrate. There has been some reports about using the tilted-axis configuration for hard disk media with a structure as shown in FIG. 1. On the substrate 91 shown in FIG. 1 is grown a seed layer or underlayer 93 on which a magnetic (recording) layer 94 is grown. A carbon overcoat layer 95 is formed on the magnetic layer 94 and an organic lubricant layer 96 is deposited for use with a magnetic transducer such as a spin-valve head on a slider. The magnetic layer 94 is grown in an oblique fashion similar to what is being done in magnetic tape media. Columnar growth occurs for the magnetic layer 94, but the columns are tilted. Zheng et al. referred above reported a Ti underlayer 93 and a CoCrPt magnetic layer 94. The CoCrPt magnetic layer 94 was sputter-deposited with a collimator disposed between the target and the substrate. The collimator has slots proposed in the U.S. Pat. No. 5,804,046 to Sawada et al. that may be swung to change the incident angle of the atoms from the target. However, no provision was made for a circular disk.

Deposition on a disk was proposed in the U.S. Pat. No. 5,875,082 to Takayama et al. using a shield or mask that was also reported by the U.S. Pat. No. 4,776,938 to Abe et al. but for a different application. The U.S. Pat. No. 5,875,082 to Takayama et al. deposited 50 nm of Ti on a glass disk substrate in an oblique fashion and formed a 100 nm thick CoCrTa magnetic layer on the Ti layer. Though the magnetic layer was deposited without a mask, the c-axes were tilted relative to the film normal (substrate normal). However, the magnetic grain columns are not vertical. FIG. 1 of the U.S. Pat. No. 5,875,082 to Takayama et al. shows inclined columns for both the underlayer and the magnetic layer.

Figure 2:
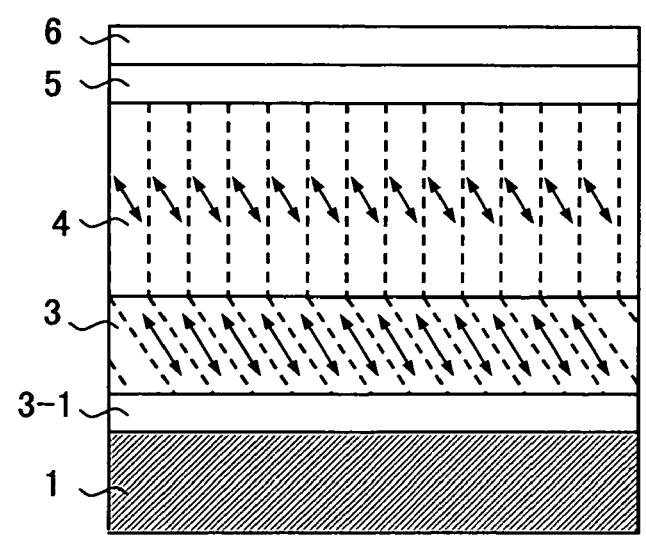
FIG. 2 is a cross sectional view showing an important part of a first embodiment of a magnetic recording medium according to the present invention.

FIG. 2 is a cross sectional view showing an important part of a first embodiment of a magnetic recording medium according to the present invention. This first embodiment of the magnetic recording medium is produced by a first embodiment of a method of producing the magnetic recording medium according to the present invention.

On a substrate 1 shown in FIG. 2 is grown an amorphous or "amorphous-like" seed layer 3-1. Here, "amorphous-like" means that the grains are small enough such that there is no sharp XRD signature. An hcp underlayer 3 is grown on the seed layer 3-1, with the (0001) texture tilted at a particular angle from the substrate normal (vertical). A Co-based magnetic (recording) layer 4 is subsequently formed on the underlayer 3. Through heteroepitaxy, the (0001) direction is maintained but the columnar growth is vertical and not tilted as in FIG. 1. A protective coating such as a C overcoat layer 5 is formed on the magnetic layer 4, and a lubricant layer 6 is formed on the C overcoat layer 5.

The underlayer 3 is preferably 2 nm to 20 nm thick and has an hcp structure which has a low-energy (0001) surface. This makes it easier to achieve lattice matching of the underlayer 3 with the hcp magnetic layer 4, so that the hcp magnetic layer 4 grows epitaxially on the hcp underlayer 3. The underlayer 3 may be made of Ru, Re or nonmagnetic alloys of CoCr such as CoCrTa, CoCrRu, and CoCrRe. In other words, the underlayer 3 may be made of a material selected from a group consisting of Os, Re, Ru, nonmagnetic CoCr, and nonmagnetic CoCr-M, where M is selected from a group consisting of Os, Re, Ru, and Ta.

The Co-based magnetic layer 4 may be combined with oxygen or oxides such as CoCrPt—O or CoCrPt—$SiO_2$. In other words, the magnetic layer 4 may be made of a material selected from a group consisting of CoCrPt, CoCrPtB, CoCrPtBCu, CoCrPt—O, CoCrPt—$SiO_2$.

The seed layer 3-1 is chosen such that the underlayer 3 forms a (0001) texture thereon, and for the small grains or amorphous structure thereof. The presence of the seed layer 3-1 gets rid of any non-uniformities in the substrate 1 and also prevents diffusion of material from the substrate 1 to the underlayer 3, or worse, to the magnetic layer 4. The seed layer 3-1 may be selected from Ti, Ta, and their alloys with Cr, of thickness of at least 1 nm to 25 nm.

No such seed layer or underlayer was employed by the U.S. Pat. No. 5,875,082 to Takayama et al. as the Ti underlayer was 50 nm and very thick. However, a well-known feature of thin-films is that the grains tend to grow larger in area when the thickness is increased such that thick layers are not conducive for obtaining good media signal to noise ratios (SNR). Moreover, from the configuration of the target, mask, and substrate used in the U.S. Pat. No. 5,875,082 to Takayama et al., it is obvious that sputtering rates were significantly reduced such that long deposition times are needed for the thick underlayer. This is not advantageous in a manufacturing setting as the available time for a disk in any one chamber is limited. Obviously, several chambers may be employed although this increases the fabrication cost.

Therefore, in this first embodiment of the magnetic recording medium, the hcp underlayer 3 is formed on the substrate 1 via the seed layer 3-1 with the c-axes tilted at an angle between 10° to 45° from the substrate normal with a distribution at this angle being less than 5°. The hcp magnetic layer 4 grows epitaxially on the hcp underlayer 4 and in a vertical columnar fashion, and the c-axis direction of the hcp magnetic layer 4 is dictated by the underlayer 3. As will be described with reference to FIG. 9B, an angle θ=10° between the applied field and the anisotropy axis reduces a switching field $H_0$ of a Stoner-Wolfarth magnetic particle with uniaxial anisotropy by 33%, and at θ=45° the switching field $H_0$ is reduced by 50%. As the hcp magnetic layer 4 grows in a columnar way, the cross-track correlation length or transition parameter is not increased.

Figure 3:
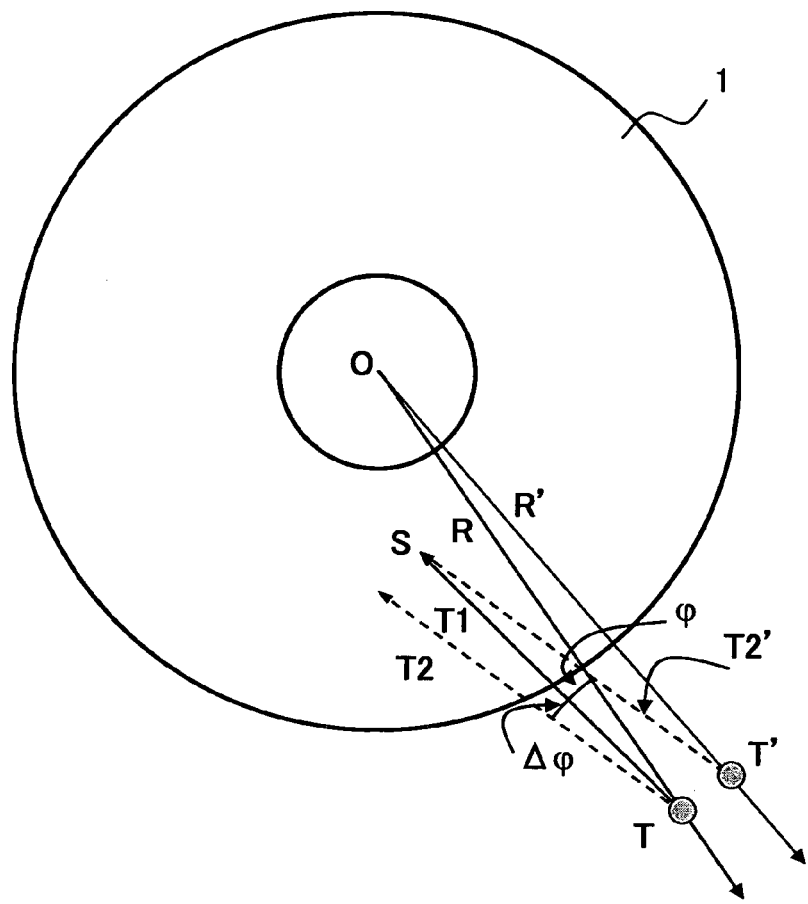
FIG. 3 is a diagram indicating the direction of deposition incidence on the film plane.

FIG. 3 is a diagram showing an important aspect of oblique deposition in making tilted-axis magnetic recording media. Point T refers to a position on the target from which particles are sputtered or evaporated. T1, T2, and T2' are particle trajectories projected onto the film (or disk) plane, and R and R' are radial lines. Assuming T1 is the desired trajectory, if point T is not far enough from the substrate center O, the angle Δϕ between T1 and T2 could be large such that at another position on the target, that is, point T', a particle with trajectory T2' is incident on point S on a substrate 1. This results in a tilted-axis magnetic recording medium with a large distribution of [0001] directions.

It should be noted that no provision for limiting Δϕ was provided in the mask described by Abe et al., the U.S. Pat. No. 5,875,082 to Takayama et al., and Zheng et al.

Figure 4:
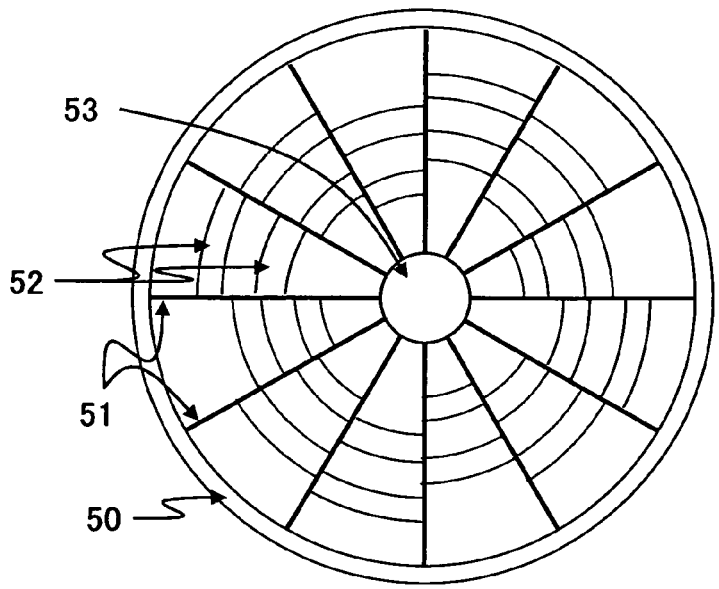
FIG. 4 is a plan view showing a mask used in a first embodiment of the method of producing the magnetic recording medium according to the present invention.

FIG. 4 is a plan view showing a mask (collimator or collimating shield) used in this embodiment of the method of producing the magnetic recording medium according to the present invention. Vertical slots 51 are positioned along the radial direction and held in place by an inner mask 53 and an outer ring 50. Tilted slots 52 are placed as shown in FIG. 4 and guide target material onto the substrate 1 at a prescribed angle. FIG. 4 shows two tilted slots 52 for each sector, but the number of tilted slots 52 may be one or more than two. The number of vertical slots 51 depends on how much tolerance there is for the angle Δϕ, and preferably, there should be at least eight vertical slots 51. Too many vertical slots 51 results in reduced deposition rates. For easier construction, the tilted slots 52 may be straight instead of curved as shown in FIG. 4, if there are enough vertical slots 51. The angle of the tilted slots 52 may be varied from 10° to 45° to obtain a particular Co-axis tilt angle. The whole assembly is rotated in one direction or may be swung clockwise and counter-clockwise to promote film thickness uniformity. The radial position of the tilted slots 52 are therefore preferably staggered or positioned in a spiral way.

Of course, the substrate 1 may be rotated to improve uniformity especially for the disk-shaped substrate 1, so that the angle between the c-axes and the recording direction may be fixed. Furthermore, it is possible to rotate the target or evaporation source about the center of the substrate 1. It is also possible to rotate both the substrate 1 and the target or evaporation source.

The mask described by the U.S. Pat. No. 4,776,938 to Abe et al. and the U.S. Pat. No. 5,875,082 to Takayama et al. may also be modified by providing similar vertical slots. However, as the target to substrate distance is increased, significant reductions in deposition rates are expected.

Figure 5A:
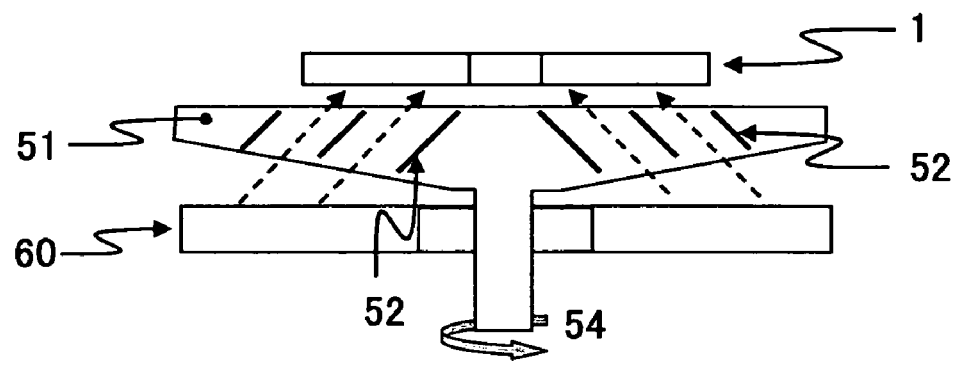
FIG. 5A is a cross sectional view showing the mask shown in FIG. 4 together with a substrate and a target.

FIG. 5A is a cross sectional view showing the mask shown in FIG. 4 together with the substrate 1 and the target 60. The target 60 shown is annular and allows a shaft 54 to be connected to the mask to a rotary motor (not shown) below the target. A conventional disk-shaped target may also be used and the mask rotated for example by a gear system at an edge 50 shown in FIG. 4. The substrate 1 may also be rotated say by rotation of a carriage, by getting an arm to engage with a hole in the substrate 1 from the substrate side makes deposition on the other side impractical. In FIG. 5A, four sets of two-slots 52 are tilted at an angle to let through evaporants at a predetermined angle.

Figure 5B:
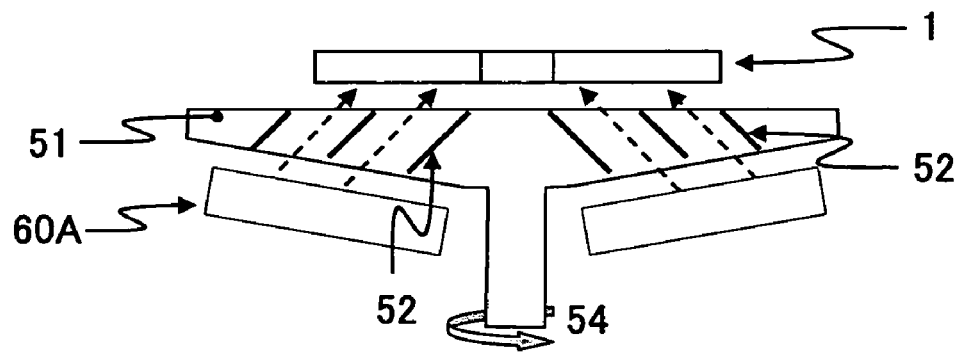
FIG. 5B is a cross sectional view showing the mask shown in FIG. 4 together with the substrate and a tapered annular target.

FIG. 5B is a cross sectional view showing the mask shown in FIG. 4 together with the substrate 1 and a tapered annular target 60A. Deposition rates may be increased with this configuration.

The U.S. Pat. No. 5,875,082 to Takayama et al. in column 6, lines 14-25 described that on some parts of the disk, the projection of the c-axis tilt on the substrate is between the radial and circumferential directions. Such an issue may be addressed by the mask-target-substrate configuration shown in FIG. 5B.

It should be noted that the mask described above is similar to what has been proposed for obtaining orientation ratio (O.R.) in longitudinal magnetic recording media. However, there are striking differences in purpose and the film growth desired. In the longitudinal media mode, the goal is to have the coercivity larger along the circumferential direction compared to the radial direction in the case of the disk-shaped magnetic recording medium. A seed layer such as CrNb is deposited using a mask. A Cr-based bcc alloy is then formed, preferably with the mask, on the seed layer. This Cr alloy has a (001) texture and is not heteroepitaxial with the initial CrNb layer. The succeeding layers, including the magnetic layer, are deposited without employing any mask. X-ray data showed that the CrNb underlayer has no particular fiber texture although TEM studies revealed that it is crystalline. Based on cross-sectional and plan-view TEM studies, the CrNb underlayer forms a corrugated structure when observed along the radial direction which is on the plane of deposition flux.

This corrugated structure has also been observed for example by McMichael et al., "Strong anisotropy in thin magnetic films deposited on obliquely sputtered Ta underlayers", J. Appl. Phys., Vol. 88, No. 9, pp. 5296-5298, November 2000 with Ta layers. The results is that the c-axes of the magnetic layer grains have a high probability of being along the circumferential direction.

Preliminary data obtained by the present inventors indicate therefore that the mechanism for the orientation ratio is similar to longitudinal magnetic recording media on textured NiP substrates and the oblique deposition of the Cr-based bcc alloy is simply to obtain the proper stress relationships to further increase O.R. values. In the tilted-media mode, the primary goal is to have the magnetic layer [0001] axis tilted from the substrate normal. But without the benefit of heteroepitaxy, this is difficult to achieve because the surface energies for non-(0001) faces are high. However, when the sputter or vapor flux is oblique, film growth is columnar and tilted towards the flux direction. In this case, the low energy (0001) surface is nearly perpendicular to the film growth and results in a c-axis that is tilted relative to the substrate normal. This type of growth may be achieved with an hcp underlayer.

The magnetic layer may be formed on the underlayer, and through heteroepitaxy, develop the same fiber texture without the disadvantages of magnetic tilted columns. For O.R. purposes, both the initial layer made of CrNb, for example, and the Cr layer are deposited in an oblique way. The initial layer forms a corrugated structure with no fiber texture and the Cr layer grows with a "vertical" (001) texture with the proper stress to promote the c-axes to align along the circumferential direction. For tilted-media purposes, an hcp layer made of Ru, for example, is deposited in an oblique fashion forming tilted grain columns with tilted (0001) axes.

It should be noted that oblique incidence deposition is employed in this case not to effect some anisotropy as Michijima et al., "Oblique-Incidence Anisotropy in Very Thin Ni—Fe Films", IEEE Trans. Magn. Vol. 35, No. 5, pp. 3443-3444, September 1999 have reported on NiFe thin films. The magnetocrystalline anisotropy of candidate magnetic layers such as CoCrPt may be greater than $5\times10^6$ erg/cm$^3$ and would dwarf any induced anisotropy from shape or stress.

What has been described above is an important modification of presently used magnetic recording media in-line manufacturing sputtering equipment. Offset sputtering may also be employed with multi-cathodes using two to four cathodes, for example. The cathodes in this case are rotated as well as the mask or, each cathode may be equipped with its own mask to select a particular particle flux incidence. In principle, cathode magnets may be strategically located or shaped so as to force the majority of adatoms to arrive at the substrate 1 at a particular incidence angle.

An offset sputtering system on a rotating substrate such as that described by Fujimoto et al., "An ultrahigh vacuum sputtering system with offset incidence magnetron sources onto a rotating substrate", Review of Scientific Instruments, Vol. 70, No. 11, pp. 4362-4365, November 1999 may also be used with good film uniformity. The underlayer may also be deposited obliquely by thermal or electron beam (e-beam) evaporation in vacuum where the particle flux direction is easier to control. Ion-beam assisted deposition may also be employed in conjunction with e-beam evaporation or with sputtering where the sputtering gas is confined near the target and far from the substrate. Moreover, in conventional sputtering units, the magnetic field may be modified to select a particular deposition incidence angle.

Figure 6:
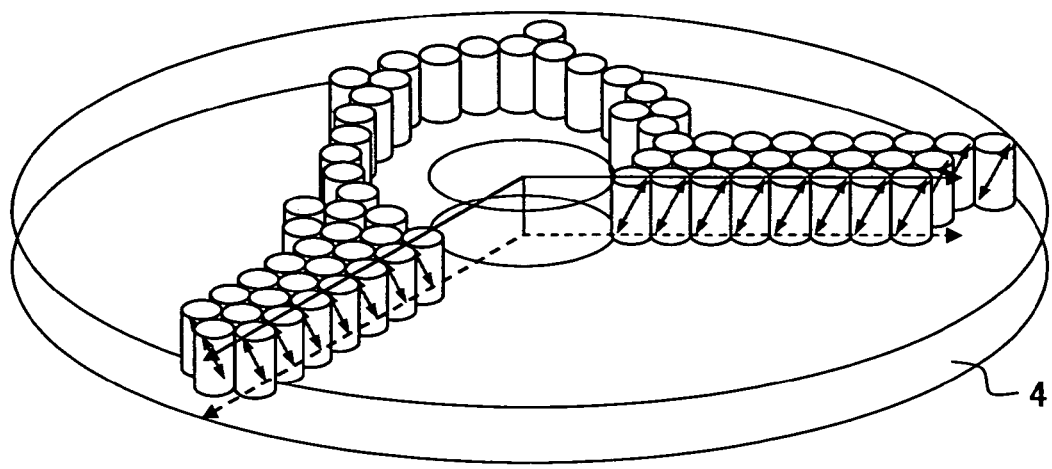
FIG. 6 is a diagram showing anisotropy directions of grains in the first embodiment of the magnetic recording medium.

FIG. 6 is a diagram showing anisotropy directions of grains of the magnetic layer 4 in the first embodiment of the magnetic recording medium. In FIG. 6, the c-axes are tilted along the radial direction and the grains are vertical columns.

Figure 7:
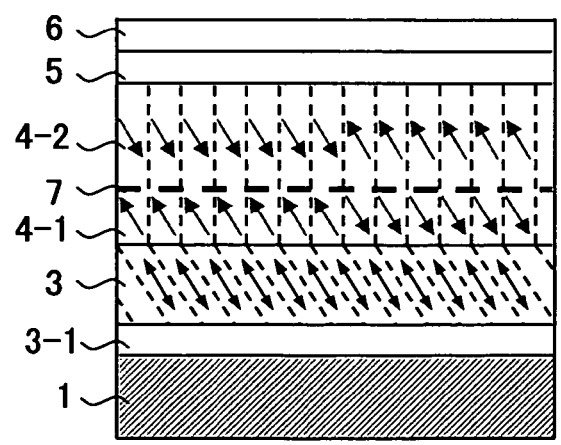
FIG. 7 is a cross sectional view showing an important part of a second embodiment of the magnetic recording medium according to the present invention.

FIG. 7 is a cross sectional view showing an important part of a second embodiment of the magnetic recording medium according to the present invention. In FIG. 7, those parts which are the same as those corresponding parts in FIG. 2 are designated by the same reference numerals.

On a substrate 1 shown in FIG. 7 is formed a seed layer 3-1 on which a tilted hcp underlayer 3 is deposited. A magnetic (recording) layer structure is comprised of a first magnetic layer 4-1 and a second magnetic layer 4-2 separated by a thin spacer layer 7 to induce antiparallel coupling between the first and second magnetic layers 4-1 and 4-2. The spacer layer 7 may be made of Ru, Re or alloys thereof with a thickness of 0.6 nm to 0.8 nm. Other spacer materials such as Os, Ir and alloys thereof may be used for the spacer layer 7. Exchange coupling is weak for Co layers with (0001) texture, but with tilted axes, sufficient antiferromagnetic coupling may be induced. The magnetic recording medium is capped with a C overcoat layer 5 and an organic lubricant layer 6.

Figure 8A:
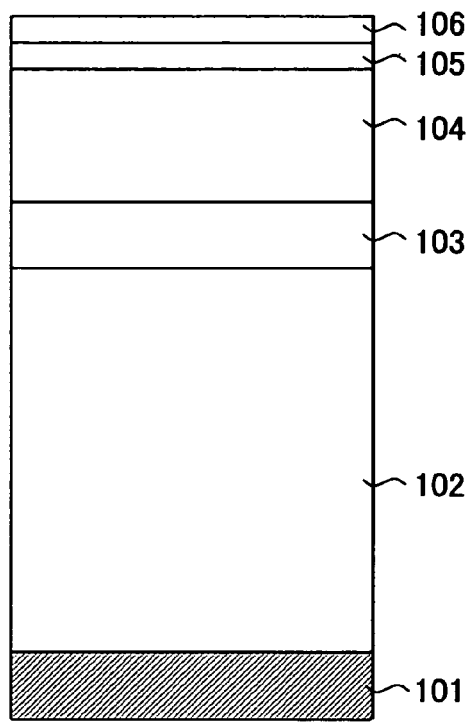
FIG. 8A is a cross sectional view showing an important part of a perpendicular magnetic recording medium with a soft magnetic underlayer.
Figure 8B:
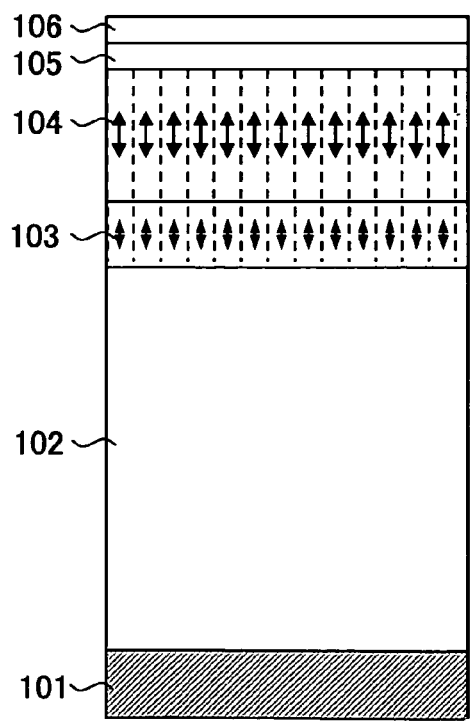
FIG. 8B is a cross sectional view showing the perpendicular magnetic recording medium shown in FIG. 10A showing the c-axis directions.

FIG. 8A is a cross sectional view showing an important part of a simple perpendicular magnetic recording medium with a substrate 101, a soft magnetic underlayer (SUL) 102, an underlayer 103, a magnetic (recording) layer 104, overcoat layer 105, and lubricant layer 106. FIG. 8B is a cross sectional view showing an important part of the simple perpendicular magnetic recording medium shown in FIG. 8A where the c-axes of the underlayer 3 are vertical assuming an hcp material is used for the underlayer 103. When used with an SPT head, the SUL 102 promotes larger fields than what may be realized with ring heads. SPT heads also have lower sidefringing fields which allow greater track densities compared to ring heads.

Figure 9A:
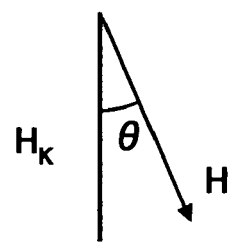
FIG. 9A is a diagram showing the applied field direction relative to the anisotropy axis.
Figure 9B:
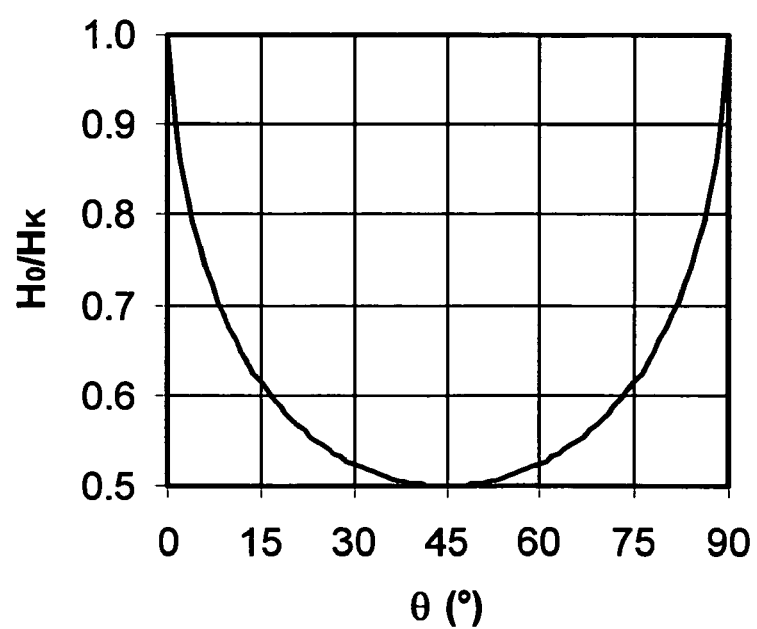
FIG. 9B is a diagram showing the switching field relative to the angle between the applied field and the anisotropy axis.

FIGS. 9A and 9B are diagrams showing the behavior of the switching field HO of a Stoner-Wolfarth magnetic particle with uniaxial anisotropy relative to the angle 0 between the applied field and the anisotropy axis. The field from an SPT head is mostly vertical and for $\theta=0$, $H_0=H_K$ as may be seen from FIG. 9B. During writing, it is likely that the grain immediately below the head is not being switched due to a very large $H_0$. This has led to the work of Mallary et al. in which a special head is designed such that the field direction is given an x-component along the track direction. However, this complicates further the already difficult head fabrication process. It may be better to develop media with tilted axes instead. Note that minimum $H_0/H_K$ (=0.5) is at $\theta=45°$ but significant reductions in $H_0/H_K$ may already be achieved at more modest angles of $\theta=15°$ where $H_0/H_K$ is approximately 0.62. This increases the possible anisotropy field $H_K$ for media beyond what may be used with perpendicular magnetic recording media, that is, overwrite may be greatly improved for SPT heads.

Figure 10:
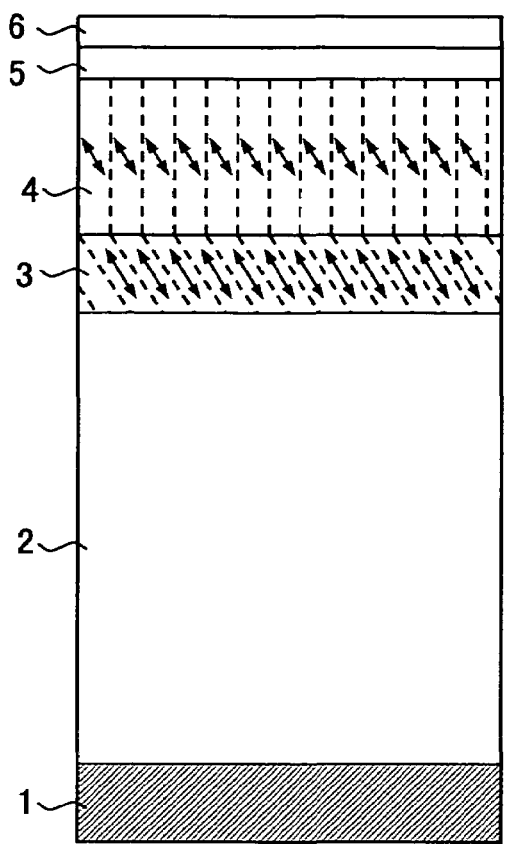
FIG. 10 is a cross sectional view showing an important part of a third embodiment of the magnetic recording medium according to the present invention.

FIG. 10 is a cross sectional view showing an important part of a third embodiment of the magnetic recording medium according to the present invention. In FIG. 10, those parts which are the same as those corresponding parts in FIG. 2 are designated by the same reference numerals, and a description thereof will be omitted.

The magnetic recording medium shown in FIG. 10 is similar to that shown in FIG. 2, except that an SUL 2 is provided between the substrate 1 and the underlayer 2 in FIG. 10. In this embodiment, the SUL 2 has a single-layer structure. But since the SUL 2 is usually 50 nm to 400 nm thick, the SUL 2 may have a multi-layer structure which is made up of a plurality of layers of the same material such as CoZrNb or, or of two different materials such as Fe and C. One or a plurality of antiferromagnetic layers (not shown) may be provided to pin the easy axis along the radial direction to reduce shot noise. Further details of SUL technology will not be discussed in this specification as the object of the present invention is to provide a tilted perpendicular magnetic recording medium having the magnetic recording layer with the tilted anisotropy easy axes.

As in the case of the first embodiment shown in FIG. 2, the underlayer 3 shown in FIG. 10 is made of an hcp material with tilted columns and [0001] direction. The magnetic layer 4 is formed heteroepitaxially on the underlayer 3 and has a vertical columnar growth. An overcoat layer 5 and a lubricant layer 6 are also formed for use with a transducer.

Figure 11:
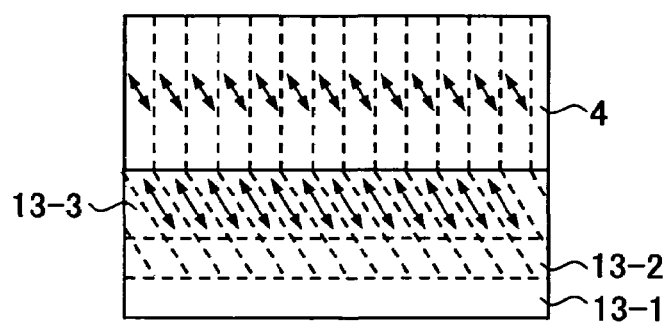
FIG. 11 is a cross sectional view showing an important part of a fourth embodiment of the magnetic recording medium according to the present invention.

FIG. 11 is a cross sectional view showing an important part of a fourth embodiment of the magnetic recording medium according to the present invention. In FIG. 11, those parts which are the same as those corresponding parts in FIGS. 2 and 10 are designated by the same reference numerals, and a description thereof will be omitted. The illustration of the overcoat layer 5 and the lubricant layer 6 above the magnetic layer 4, and the SUL 2 and the substrate 1 under the underlayer 3 is omitted in FIG. 11.

In the magnetic recording medium shown in FIG. 11, the underlayer 3 has a multi-layer structure including an amorphous or amorphous-like layer 13-1 to cut any microstructural information from the SUL 2, an fcc layer 13-2 preferably deposited in an oblique way with the [111] direction tilted from the substrate normal, and an hcp layer 13-3 also deposited obliquely. The fcc layer 13-2 may also be hcp with tilted [0001] direction as in the case of the hcp layer 13-3.

The amorphous or amorphous-like layer 13-1 may be made of a material similar to that used for the seed layer 3-1 shown in FIG. 2 and have a thickness similar to that of the seed layer 3-1. The fcc layer 13-2 may be made of a suitable fcc material having a thickness of 1 nm to 5 nm. The hcp layer 13-3 may be made of a material similar to that used for the hcp underlayer 3 shown in FIG. 2 and have a thickness similar to that of the hcp underlayer 3.

Figure 12:
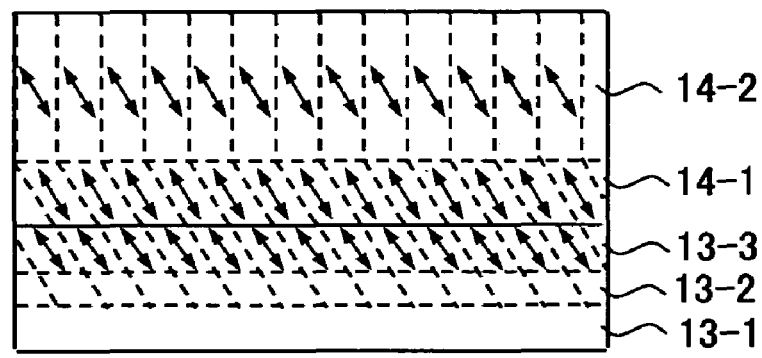
FIG. 12 is a cross sectional view showing an important part of a fifth embodiment of the magnetic recording medium according to the present invention.

FIG. 12 is a cross sectional view showing an important part of a fifth embodiment of the magnetic recording medium according to the present invention. In FIG. 12, those parts which are the same as those corresponding parts in FIG. 11 are designated by the same reference numerals, and a description thereof will be omitted. The illustration of the overcoat layer 5 and the lubricant layer 6 above the magnetic layer 4, and the SUL 2 and the substrate 1 under the underlayer 3 is omitted in FIG. 12.

In the magnetic recording medium shown in FIG. 12, the magnetic layer 4 has a multi-layer structure made of at least two magnetic layers 14-1 and 14-2. The two magnetic layers 14-1 and 14-2 may be made of a material similar to that forming the magnetic layer 4 shown in FIG. 2. The first magnetic layer 14-1 is deposited obliquely as well as the closest underlayer 13-3. The second magnetic layer 14-2 is deposited in a conventional way with vertical columnar growth. The first magnetic layer 14-1 has preferably a lower saturation magnetization Ms than the second magnetic layer 14-2. The second magnetic layer 14-2 may be thicker than the first magnetic layer 14-1 in a case where the saturation magnetizations Ms of the first and second magnetic layers 14-1 and 14-2 are similar. This type of structure shown in FIG. 12 may be advantageous when a very thin underlayer 3 is desired especially with the use of the SUL 2 and SPT heads. Reducing the spacing between the write head and the SUL 2 improves resolution, that is, allows sharper transitions. As only a portion of the magnetic layer 4 grows in an inclined fashion, the magnetic footprint is not as large as when the entire magnetic layer 4 is deposited obliquely.

Figure 13:
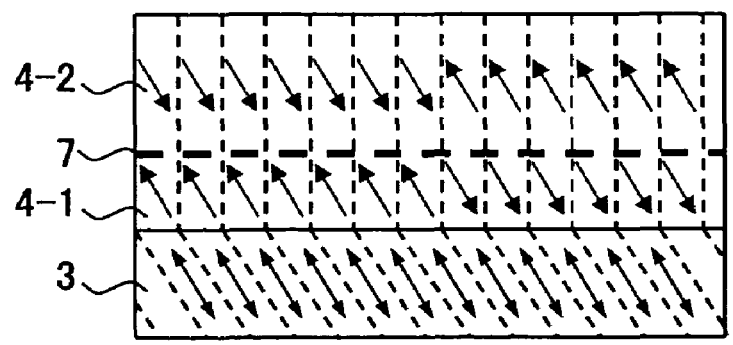
FIG. 13 is a cross sectional view showing an important part of a sixth embodiment of the magnetic recording medium according to the present invention.

FIG. 13 is a cross sectional view showing an important part of a sixth embodiment of the magnetic recording medium according to the present invention. In FIG. 13, those parts which are the same as those corresponding parts in FIG. 7 are designated by the same reference numerals, and a description thereof will be omitted. The illustration of the overcoat layer 5 and the lubricant layer 6 above the magnetic layer 4, and the SUL 2 and the substrate 1 under the underlayer 3 is omitted in FIG. 13.

In the magnetic recording medium shown in FIG. 13, the magnetic layer 4 is made of at least two antiferromagnetically-coupled magnetic layers 4-1 and 4-2. The two magnetic layers 4-1 and 4-2 may be made of a material similar to that forming the magnetic layer 4 shown in FIG. 2. Between the first and second magnetic layers 4-1 and 4-2 is formed a thin spacer layer 7 that induces antiparallel coupling. The spacer layer 7 may be made of a material similar to that forming the spacer layer 7 shown in FIG. 7, and have a thickness similar to that of the spacer layer 7 shown in FIG. 7. Vertical columnar growth is preferred for both the first and second magnetic layers 4-1 and 4-2 but the first magnetic layer 4-1 may also be deposited obliquely as in the fifteenth embodiment shown in FIG. 12. The hcp underlayer 3 may have the multi-layer structure shown in FIG. 11 or 12 wherein the seed layer 13-1, the fcc layer 13-2, and the hcp underlayer 13-3 are used.

Figure 14:
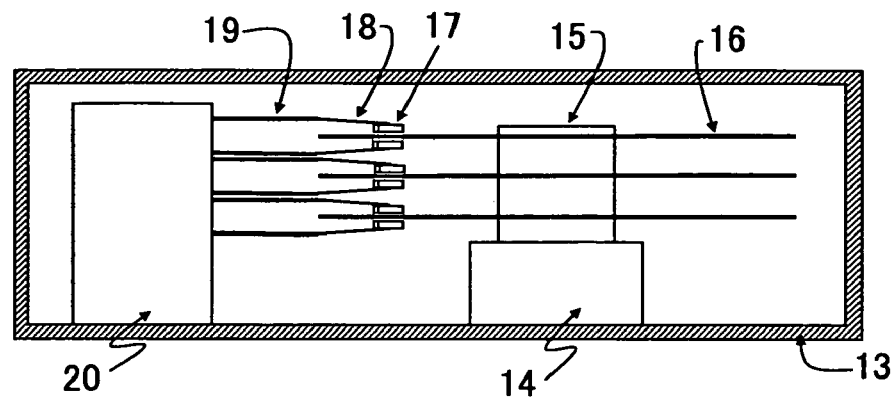
FIG. 14 is a cross sectional view showing an important part of an embodiment of a magnetic storage apparatus according to the present invention.

Next, a description will be given of an embodiment of a magnetic storage apparatus according to the present invention, by referring to FIGS. 14 and 15. FIG. 14 is a cross sectional view showing an important part of this embodiment of the magnetic storage apparatus, and FIG. 15 is a plan view showing an important part of this embodiment of the magnetic storage apparatus with a top cover thereof removed.

Figure 15:
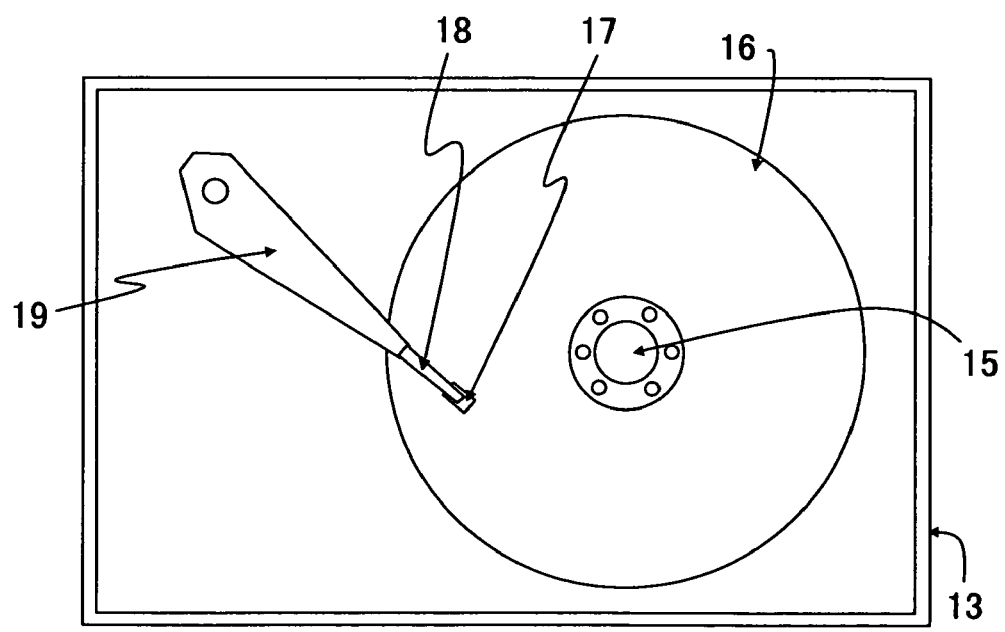
FIG. 15 is a plan view showing an important part of the embodiment of the magnetic storage apparatus with a top cover removed.

In FIGS. 14 and 15, on a base 13 is mounted a motor 14 which turns a hub 15 on which are attached a plurality of magnetic recording disks 16. Each magnetic recording disk 16 may have the structure of any of the embodiments of the magnetic recording medium described above. Information is read from the magnetic recording disk 16 by a MR (or GMR) head which is attached to a slider 17. An inductive-type head is merged with the MR head, and information is written on the magnetic recording disk 16 by the inductive-type head. The MR head and the inductive-type head form a transducer. The slider 17 is connected to a suspension 18 which pushes the slider 17 against the recording surface of the magnetic recording disk 16. The surface of the slider 17 is patterned such that for a given disk rotation speed and suspension stiffness, the slider 17 flies at a particular height above the surface of the magnetic recording disk 16. This suspension 18 is in turn fixed to a rigid arm 19 which is connected to an actuator 20. This provides the ability to write over a large portion of the magnetic recording disk 16.

Of course, the number of magnetic recording disks 16 is not limited to three as shown in FIG. 14, and only one or, two or, more than three magnetic recording disks 16 may be provided in the magnetic storage apparatus.

Moreover, the magnetic recording medium of the present invention is not limited to magnetic recording disks, and the present invention is applicable to any type of magnetic recording media, including magnetic recording cards.

The tilt angle of the anisotropy easy axes of the magnetic recording layer may be set differently depending on the radial position (or region) on magnetic recording disk. Similarly, the tolerance of the tilt angle of the anisotropy easy axes of the magnetic recording layer may be set differently depending on the radial position (or region) on the magnetic recording disk. For example, the tilt angle of the anisotropy easy axes may be varied during the fabrication process by varying the angles of the tilted slots 52 shown in FIG. 5A or 5B similarly to Venetian blinds. Since the linear velocity varies depending on the radial position on the magnetic recording disk, it is possible to make the performance of the magnetic recording disk approximately uniform regardless of the radial position, by varying the tilt angle (or the tolerance of the tilt angle) of the anisotropy easy axes of the magnetic recording layer depending on the radial position (or region) on the magnetic recording disk.

Further, the present invention is not limited to these embodiments, but various variations and modifications may be made without departing from the scope of the present invention.

What is claimed is:

1. A perpendicular magnetic recording medium comprising:
    a substrate;
    an hcp Co-based magnetic layer;
    an hcp underlayer provided on the substrate with c-axes tilted at an angle between 10° to 45° from a substrate normal with a distribution at said angle being less than 5°,
    wherein said magnetic layer is grown epitaxially on said underlayer and in a vertical columnar fashion, and said magnetic layer includes at least a first magnetic layer provided on said underlayer and a second magnetic layer disposed above said first magnetic layer;
    an amorohous seed layer, having a thickness of at least 1 nm, disposed between said underlayer and said substrate; and
    a spacer layer made of a material selected from a group consisting of Ru, Re, Os, Ir, and alloys thereof and disposed between said first and second magnetic layers so that antiparallel coupling is induced between said first and second magnetic layers,
    wherein said amorohous seed layer includes one or a plurality of antiferromagnetic layers.

2. The perpendicular magnetic recording medium as claimed in claim 1, further comprising:
    a soft magnetic layer, having a thickness of 50 nm to 400 nm, disposed between said underlayer and said substrate.

3. The perpendicular magnetic recording medium as claimed in claim 1, wherein said underlayer is made of a material selected from a group consisting of Os, Re, Ru, nonmagnetic CoCr, and nonmagnetic CoCr-M, where M is selected from a group consisting of Os, Re, Ru, and Ta.

4. The perpendicular magnetic recording medium as claimed in claim 1, wherein at least one of said first and second magnetic layers is made of a material selected from a group consisting of CoCrPt, CoCrPtB, CoCrPtBCu, CoCrPt—O, CoCrPt—$SiO_2$.

5. The perpendicular magnetic recording medium as claimed in claim 1, wherein said hcp underlayer has a thickness of 2 nm to 20 nm.

6. The perpendicular magnetic recording medium as claimed in claim 2, further comprising:
    an amorphous seed layer, having a thickness of at least 1 nm, disposed between said underlayer and said soft magnetic layer.

7. The perpendicular magnetic recording medium as claimed in claim 1, further comprising:
    an fcc layer, disposed between said underlayer and said substrate, in direct contact with said underlayer and having a thickness of 1 nm to 5 nm.

8. A magnetic storage apparatus comprising:
    at least one perpendicular magnetic recording medium; and
    a transducer writing information on and/or reading information from said magnetic recording medium;
    said perpendicular magnetic recording medium comprising:
        a substrate;
        an hcp Co-based magnetic layer;
        an hcp underlayer provided on the substrate with c-axes tilted at an angle between 10° to 45° from a substrate normal with a distribution at said angle being less than 5°, wherein said magnetic layer is grown epitaxially on said underlayer and in a vertical columnar fashion, and said magnetic layer includes at least a first magnetic layer provided on said underlayer and a second magnetic layer disposed above said first magnetic layer;
        an amorphous seed layer, having a thickness of at least 1 nm, disposed between said underlayer and said substrate; and
        a spacer layer made of a material selected from a group consisting of Ru, Re, Os, Ir, and alloys thereof and disposed between said first and second magnetic layers so that antiparallel coupling is induced between said first and second magnetic layers,
    wherein said amorphous seed ayer of said perpendicular magnetic recording medium includes one or a pluralitv of antiferromagnetic layers.

9. The magnetic storage apparatus as claimed in claim 8, wherein said perpendicular magnetic recording medium further comprises:
    a soft magnetic layer, having a thickness 50 nm to 400 nm, disposed between said underlayer and said substrate.

10. The magnetic storage apparatus as claimed in claim 8, wherein said underlayer of said perpendicular magnetic recording medium is made of a material selected from a group consisting of Os, Re, Ru, nonmagnetic CoCr, and nonmagnetic CoCr-M, where M is selected from a group consisting of Os, Re, Ru, and Ta.

11. The magnetic storage apparatus as claimed in claim 9, wherein said perpendicular magnetic recording medium further comprises:
    an amorphous seed layer, having a thickness of at least 1 nm, disposed between said underlayer and said soft magnetic layer.

* * * * *